Figure 1:
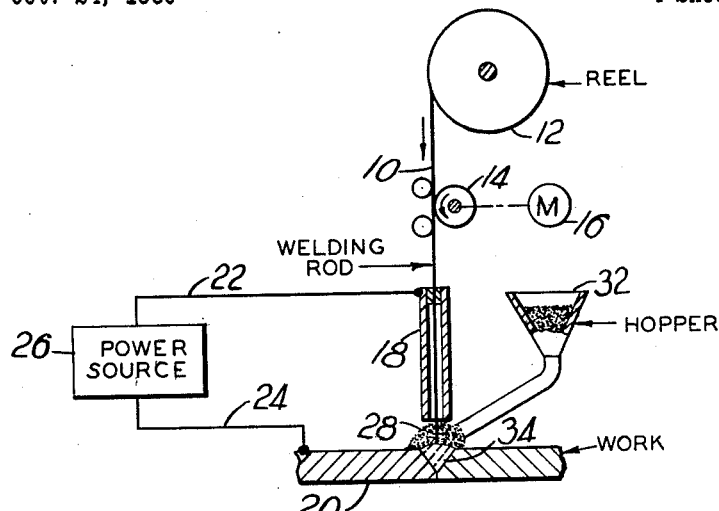

Feb. 19, 1963 C. E. JACKSON 3,078,193
SUBMERGED MELT WELDING PROCESS AND COMPOSITION
Filed Oct. 24, 1960 4 Sheets-Sheet 1

INVENTOR.
CLARENCE E. JACKSON
BY Barnwell A. King
ATTORNEY

Feb. 19, 1963 C. E. JACKSON 3,078,193
SUBMERGED MELT WELDING PROCESS AND COMPOSITION
Filed Oct. 24, 1960 4 Sheets-Sheet 4

INVENTOR.
CLARENCE E. JACKSON
BY Barnwell R. King
ATTORNEY

United States Patent Office 3,078,193
Patented Feb. 19, 1963

3,078,193
SUBMERGED MELT WELDING PROCESS AND COMPOSITION
Clarence E. Jackson, Berkeley Heights, N.J., assignor to Union Carbide Corporation, a corporation of New York
Filed Oct. 24, 1960, Ser. No. 64,547
7 Claims. (Cl. 148—26)

This invention relates to submerged melt welding and composition, and more particularly to a work-in-circuit arc welding wherein a consumable metal wire or rod electrode deposits molten metal beneath a blanket of granular welding composition.

The invention provides a submerged melt welding composition consisting essentially of silicate selected from the class consisting of manganese silicate and manganese alumina silicate, in which the ratio of MnO to $SiO_2$ is between 0.6 and 1.0, inclusive, to minimize the amount of such composition needed for effective welding therewith; said composition containing from a trace to 8% $CaF_2$; and from a trace to 3.0% BaO to control the ionization potential of the composition by effectively increasing such potential with a decrease in the BaO content thereof.

In the formulation of granular compositions for submerged-arc welding, particularly of the MnO—$SiO_2$ and MnO—$Al_2O_3$—$SiO_2$ types, an understanding of the problems associated with control over the melting rate of the electrode and consumption of the welding composition is essential. In fact, a frequently used standard of comparison between various types of welding compositions is based upon the ratio of the flux consumption to that of the melting rate of the electrode. Usually the producer having the lowest melt to electrode consumption ratio points to this relationship as making his material more suitable for use than that of a competitive manufacturer exhibiting a non comparable ratio. Directly associated with this standard, is the matter of welding economics and also satisfactory mechanical characteristics of the metal as deposited.

It is well known in the welding art that as the ratio of flux consumption to metal deposited by the consumable electrode increases, the cost of the flux utilized in such an operation will increase directly with a comparable increase in said ratio. However, previous to this invention, the welding art has not successfully formulated a welding flux capable of adequately controlling this ratio. All previous approaches readily accepted the particular ratio which accompanied adequate welding performance. Nevertheless, the ever present desire to increase welding economics while at the same time providing satisfactory welds has focused attention upon a new method for controlling the flux consumption-to-electrode melting rate ratio.

Previous to this invention, MnO and $SiO_2$ content have been held to within welding flux formulation specification limits which provided adequate welding performance while minimizing undesirable spatter, porosity, and erratic arcing. Little attention was given to the effects of MnO and $SiO_2$ upon the recovery of manganese and silicon in the weld zone. Investigation has revealed, however, that as consumption of these constituents increases, the recovery of Mn and Si in the weld metal similarly increases. Up until the advent of the present invention, the importance of this relationship has not been generally recognized as an essential factor in the formulation of welding fluxes for submerged-arc welding.

The basic object of this invention is to provide a method for adequately controlling the electrode deposition rate over a wide range while being able to independently control the flux consumption rate.

Another object is to satisfactorily control the ratio of flux consumption to consumable welding electrode deposition.

Still another object is to provide means for minimizing the presence of manganese and silicon in weld metal by decreasing the ratio of flux consumed to electrode deposited.

A further object is to minimize unit weld costs by reducing flux consumption, while at the same time increasing weld metal deposition.

Figure 2:
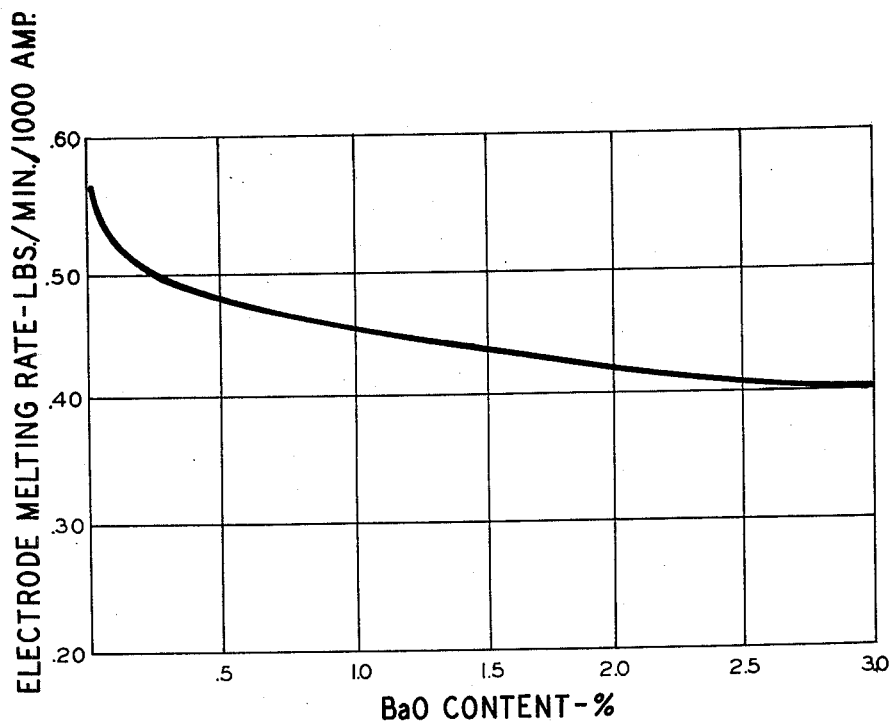
Figure 3:
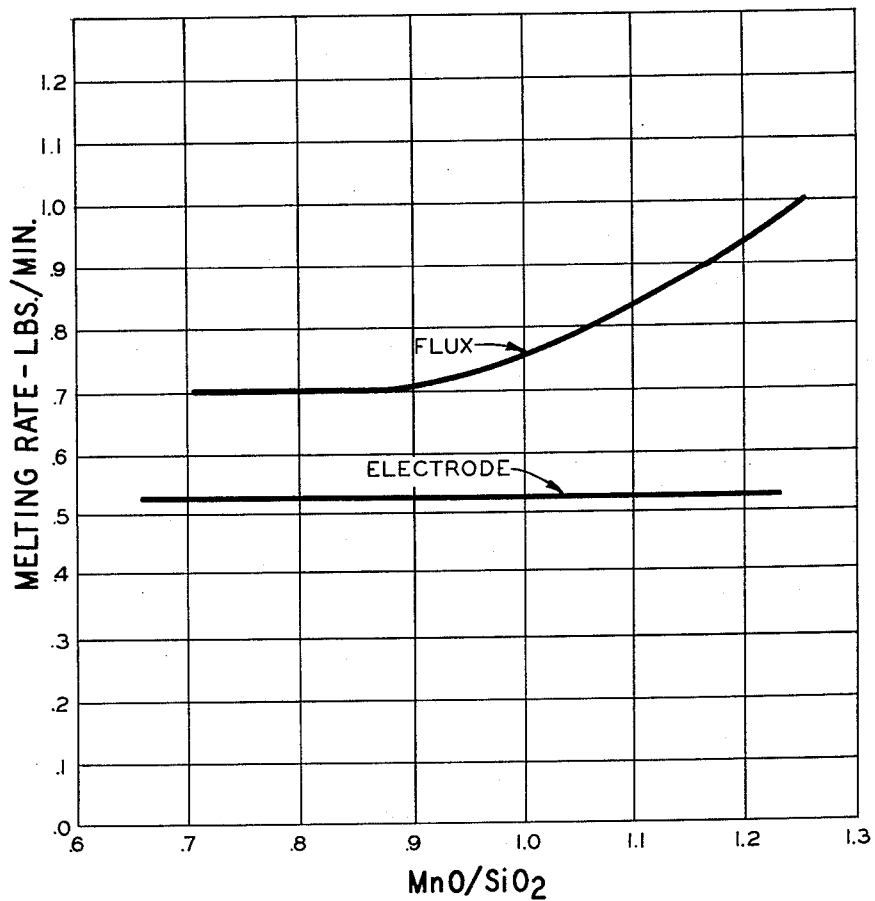
Figure 4:
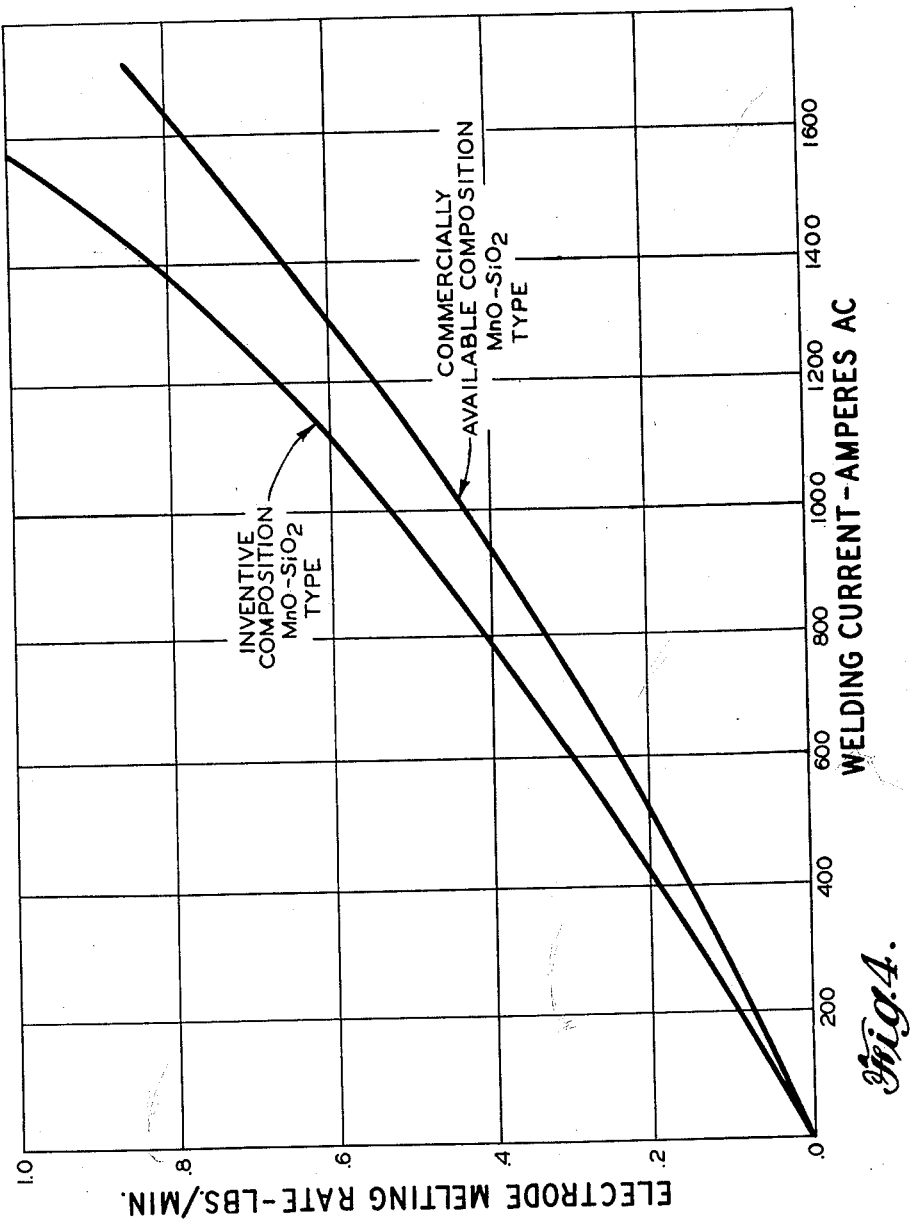

In the drawings:
FIG. 1 is a view in elevation of a submerged arc welding set-up illustrating the invention; and
FIGS. 2–4 are graphical representations.

As shown in FIG. 1, a consumable electrode composed of metal in the form of wire or rod 10 is drawn from a reel 12 by a feed roll 14 which is driven by a motor 16, and thereby fed through a contact tube 18 toward the work 20 to be welded. Such electrode is connected in an arc welding circuit that includes such work and conductors 22 and 24 connecting a welding power source 26 to the contact tube 18 and work 20 respectively. Granular welding composition 28 is delivered to the welding site by gravity through a pipe 30 from a hopper 32 containing a supply of such composition. Relative movement between the work and the electrode 10 under such composition 28, in the direction of the seam 34 occurs during the welding operation.

TABLE I

Melting Rate of Flux and Electrode for Commercial Submerged-Arc Fluxes

| Producer | Flux, lbs./min. | Electrode, lbs./min. | Ratio, Flux/Electrode |
|---|---|---|---|
| A | 0.88 | 0.42 | 2.1 |
| B | 0.80 | 0.44 | 1.8 |
| C | 0.80 | 0.43 | 1.9 |
| D | 0.80 | 0.48 | 1.7 |
| E | 0.76 | 0.45 | 1.7 |
| F | 0.80 | 0.44 | 1.8 |
| G | 1.10 | 0.42 | 2.6 |
| H | 0.95 | 0.40 | 2.4 |
| I | 1.02 | 0.42 | 2.4 |
| J | 1.00 | 0.44 | 2.3 |

NOTE.—Welds made at 900 amperes with alternating current, 40 volts, and 24 in./min. travel with ¼ in. diameter electrode. All values calculated to 1000 amperes for comparison.

Table I indicates typical results obtained with commercial submerged-arc-welding fluxes. It is apparent from such comparative data, that the melting rate of the consumable electrode with several kinds of commercial fluxes will vary from a low of 0.40 lbs./min. to a high of 0.48 lb./min. at 1000 amperes welding current. While at the same time, the flux consumption for this group of data ranged from 0.76 to 1.10 lbs./min.; thus, yielding a flux-to-electrode ratio range of 1.7 to 2.6.

The variation in this ratio coupled with the excellent performance characteristics of the MnO—$SiO_2$ and MnO—$Al_2O_3$—$SiO_2$ type of compositions has lent itself to an investigation of the development of submerged-arc welding compositions exhibiting lower flux-to-electrode ratios than heretofore obtainable.

As a way toward lowering the flux-to-electrode ratio, it was sought to increase the melting rate of the electrode and also to decrease the consumption of the flux as controlled by the formulation of the welding composition.

In the past, little attention has been paid to the content of incidental CaO, MgO, and BaO in the commercial manufacture of sumberged-arc welding fluxes of the MnO—$SiO_2$ type and the MnO—$Al_2O_3$—$SiO_2$ types. A comparison of such commercially available fluxes is made in Table II. Here considerable CaO, together with BaO and other incidental constituents is present. Hence, it was sought to carefully study the influence of these constituents upon the entire welding operation.

TABLE II

*Typical Compositions for Several Commercial Submerged-Arc Fluxes*

| Constituent | Percent Present | | | | |
|---|---|---|---|---|---|
| | K | L | M | N | O |
| SiO₂ | 40.12 | 44.70 | 39.89 | 38.00 | 33.0 |
| CaO | 6.09 | 5.04 | 5.29 | 5.50 | 7.0 |
| MgO | 0.03 | 0.44 | 1.32 | 0.75 | 1.0 |
| Al₂O₃ | 4.19 | 2.06 | 2.46 | 4.00 | 20.0 |
| MnO | 43.16 | 40.36 | 39.36 | 42.11 | 28.0 |
| TiO₂ | 0.12 | ND | 0.00 | 0.25 | 0.5 |
| FeO | 1.01 | 0.70 | 1.48 | 1.80 | 1.89 |
| Na₂O | 0.21 | ND | 0.23 | 0.20 | 0.3 |
| K₂O | ND | ND | 0.87 | 0.20 | 0.3 |
| CaF₂ | 5.46 | 4.80 | 5.75 | 5.00 | 5.0 |
| BaO | 0.92 | 1.57 | 2.73 | 1.25 | 0.75 |
| S | 0.03 | 0.01 | 0.02 | 0.02 | 0.02 |
| P | 0.10 | 0.02 | 0.05 | 0.03 | 0.03 |

ND—Not determined.

FIG. 2 presents the results of a number of weld tests performed with various flux compositions of the MnO—SiO₂ type. The range of BaO present varied from substantially 0 to 3.0 percent. Here, most dramatically, is revealed that there exists a direct correlation between the melting rate of the consumable electrode to that of the amount of BaO present in the composition. It is apparent that as the amount of BaO present is increased the melting rate of the electrode decreases. Furthermore, with the proper selection of raw materials, the electrode melting rate can be controlled from over 0.50 lb./min. down to 0.40 lb./min. Since it is desirable to obtain maximum electrode deposition, the subsequent welding compositions tested were formulated to provide a deposition rate of at least 0.50 lb./min.

TABLE III

*Selected Heats of MnO—SiO₂ Type of Submerged-Arc Composition*

| Raw Materials | Heat | | | | | | | |
|---|---|---|---|---|---|---|---|---|
| | 1 | 2 | 3 | 4 | 5 | 6 | 7 | 8 |
| Manganese Ore, Lbs | 8.4 | 8.2 | 8.0 | 8.2 | [1] 10.0 | 8.8 | 9.2 | 8.4 |
| Silica, Lbs | 5.5 | 5.7 | 5.9 | 5.7 | 4.4 | 5.1 | 4.7 | 5.5 |
| Calcium Fluoride, Lbs | 1.1 | 1.1 | 1.1 | 1.1 | 1.1 | 1.1 | 1.1 | 1.1 |

[1] Manganese Carbonate; all other heats made with manganese dioxide ore.

*Chemical Composition of Fused Product—Percent*

| | | | | | | | | |
|---|---|---|---|---|---|---|---|---|
| SiO₂ | 43.6 | 44.1 | 45.7 | 44.2 | 45.7 | 41.2 | 39.0 | 44.4 |
| MnO | 45.4 | 45.7 | 41.5 | 42.9 | 33.8 | 46.2 | 48.9 | 44.5 |

*Typical Analysis of Heat No. 4—Percent*

SiO₂ ———————————————————— 44.20
CaO ————————————————————— 1.06
MgO ————————————————————— 0.18
Al₂O₃ ———————————————————— 2.00
MnO ————————————————————— 42.90
TiO₂ ———————————————————— 0.08
FeO ————————————————————— 1.50
Na₂O ————————————————————— 0.34
K₂O ————————————————————— 0.36
CaF₂ ———————————————————— 6.90
BaO ————————————————————— 0.11

Table III discloses the various types of welding compositions considered and studied whose raw materials were so selected as to minimize the BaO and CaO content. Subsequently, the actual welding tests performed (Table IV) indicated that the electrode melting rate for these welding compositions was higher than any material previously studied. It is apparent that the BaO and other incidental constituents such as CaO and alkaline elements which are present in commercial welding fluxes are critical constituents in the formulation of the welding flux. Further, such comparative data revealed that control over the electrode melting rate could be satisfactorily controlled by adjusting the content of BaO and other incidental constituents.

Hence, an understanding of the factors relative to increasing the melting rate of the electrode thus provides a solution to the first phase for formulating a welding composition with a low flux-to-electrode melting ratio.

TABLE IV

*Results of Welding Tests [1] With Compositions in Table III*

| Heat No. | Flux | Electrode | Ratio, Flux/Electrode |
|---|---|---|---|
| 1 | 0.78 | 0.52 | 1.5 |
| 2 | 0.76 | 0.52 | 1.4 |
| 3 | 0.74 | 0.52 | 1.4 |
| 4 | 0.71 | 0.52 | 1.3 |
| 5 | 0.70 | 0.51 | 1.3 |
| 6 | 0.86 | 0.51 | 1.7 |
| 7 | 0.90 | 0.51 | 1.8 |
| 8 | 0.76 | 0.51 | 2.0 |

[1] Welding tests for reference used same welding procedure as given in Table I.

Further consideration of the data in Table IV obtained from the welding tests indicates that the range of the flux consumed varied from 0.70 to 0.90 lb./min. It is apparent that the flux consumption is not dependent upon the BaO and other incidental constituent contents. However, it is important to determine the factors which relate to flux consumption since the flux-to-electrode ratio varied from 1.3 to 2.0 lbs./min. The influence of the BaO in the composition appears not to be significant upon flux consumption; but instead, the flux consumption is a function of the principal constituents present; namely, the amount MnO and SiO₂.

Since the compositions examined in Table II were essentially binary in character, any factor dependent upon the composition may be related to the amount of either constituent present or more precisely to the ratio of these components.

Consequently, the MnO/SiO₂ ratio was examined and its effects upon flux consumption indicated in FIG. 2. Unexpectantly, the flux consumption was observed to be related to the MnO/SiO₂, wherein it was found that consumption increases rapidly beyond a Mno/SiO₂ ratio of approximately 1. The inherent physical characteristics such as melting temperature, specific heat, electrical conductivity, and ionization behavior of these principal constituents have a strong influence upon flux consumption.

Hence, the second phase relative to controlling flux consumption provides the method by which a desired flux formulation leading to a controlled flux-to-electrode ratio can be obtained.

With an understanding of the mechanism necessary for controlling the melting rate of the electrode and the welding flux consumption, the formulation of a welding flux capable of providing any desired ratio flux consumption to electrode melting rate is possible.

The welding art has long searched for a welding flux capable of providing a high electrode melt rate for a given flux consumption rate. Such a formulation, based on the above findings, must have a low BaO and impurity content together with an $MnO/SiO_2$ ratio of less than 1.

The following is an actual formulation of a welding flux of the manganese silicate type:

| | Percent |
|---|---|
| MnO | 42.0 |
| $SiO_2$ | 45.0 |
| $CaF_2$ | 6.9 |
| MgO | 0.3 |
| CaO | 1.2 |
| BaO | 0.1 |
| $Al_2O_3$ | 2.0 |
| FeO | 1.5 |
| $TiO_2$ | 0.1 |
| $K_2O$ | 0.4 |
| $Na_2O$ | 0.4 |
| PbO | 0.1 |
| | 100.0 |

Tests over a range of welding currents (from 400 to 1550 amperes) made with the newly formulated flux as compared with a well known commercially available flux shown in Table V revealed that:

(1) The electrode melting for the new composition was higher in all cases.

(2) The flux consumption was lower in all cases which resulted in a large reduction in the flux consumption to electrode melting rate ratio.

TABLE V
*Welding Tests Comparing Commercial Submerged-Arc Flux With New Composition*

| Flux | Welding Procedure | | | Melting Rate—Lbs./Min. | | |
|---|---|---|---|---|---|---|
| | Current, Amperes | Voltage, Volts | Travel, i.p.m. | Electrode | Flux | Ratio, Flux/Electrode |
| Commercial | 900 A.C. | 40 | 24 | 0.358 | 0.880 | 2.50 |
| New | 900 A.C. | 40 | 24 | 0.456 | 0.670 | 1.45 |
| Commercial | 900 A.C. | 35 | 24 | 0.386 | 0.630 | 1.63 |
| New | 900 A.C. | 35 | 24 | 0.460 | 0.485 | 1.05 |
| Commercial | 900 A.C. | 30 | 24 | 0.419 | 0.422 | 1.00 |
| New | 900 A.C. | 30 | 24 | 0.480 | 0.330 | 0.69 |
| Commercial | 1550 A.C. | 41 | 11 | 0.736 | 0.890 | 1.21 |
| New | 1550 A.C. | 41 | 11 | 0.980 | 0.990 | 1.00 |
| Commercial | 1200 A.C. | 40 | 12.5 | 0.560 | 0.940 | 1.68 |
| New | 1200 A.C. | 40 | 12.5 | 0.690 | 0.675 | 0.98 |
| Commercial | 600 A.C. | 30 | 20 | 0.250 | 0.348 | 1.38 |
| New | 600 A.C. | 30 | 20 | 0.293 | 0.304 | 1.04 |
| Commercial | 600 D.C.R.P. | 30 | 20 | 0.234 | 0.383 | 1.63 |
| New | 600 D.C.R.P. | 30 | 20 | 0.273 | 0.298 | 1.09 |
| Commercial | 600 D.C.S.P. | 30 | 20 | 0.327 | 0.410 | 1.25 |
| New | 600 D.C.S.P. | 30 | 20 | 0.386 | 0.261 | 0.67 |
| Commercial | 400 D.C.R.P. | 26 | 20 | 0.180 | 0.255 | 1.42 |
| New | 400 D.C.R.P. | 26 | 20 | 0.188 | 0.216 | 1.15 |

Figure 5:
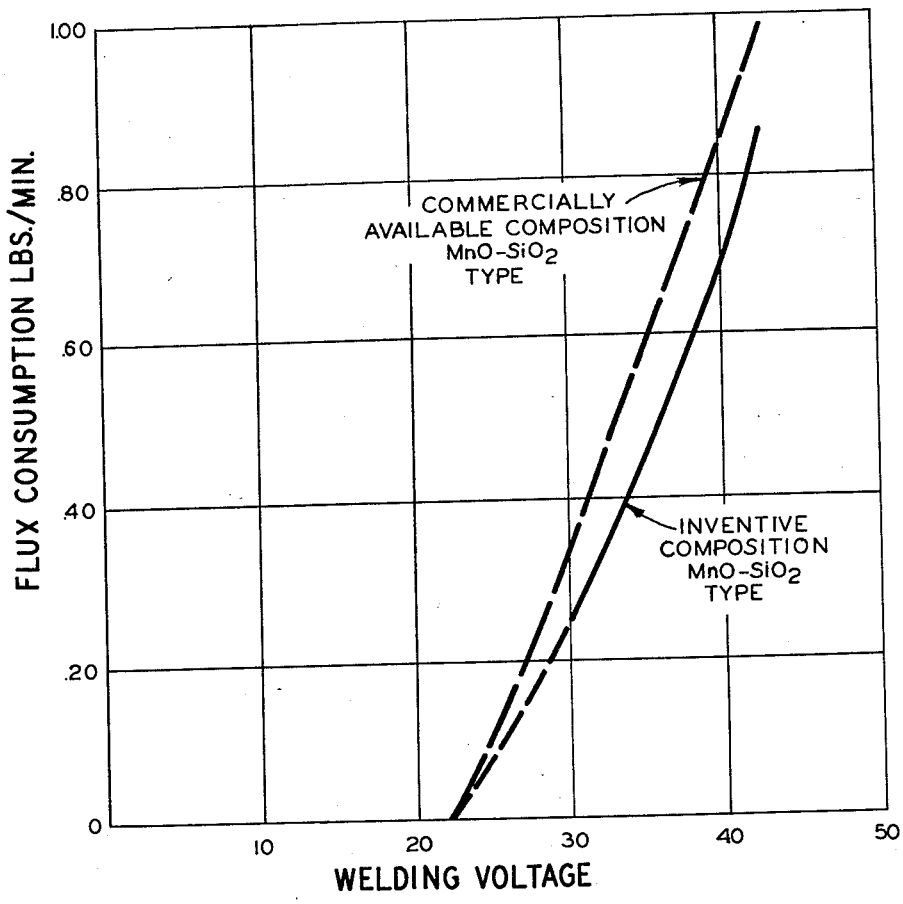

FIGURE 4 represents a trace of data tabulated in Table V and further emphasizes the increase (ranging from 20 to 30 percent) of the electrode milling rate of the new flux as compared with prior commercially available flux. With the increase in the electrode melt rate there exists a decrease in the flux consumption equal to from 15 to 30 percent for that of the new formulation over that for the commercially available flux as shown in FIG. 5.

As a result of this phenomenon, the flux consumption to electrode deposition ratio is drastically reduced for the new composition. For example, as shown in Table V, at 900 amperes, 40 volts, 24 in./min. travel, the flux consumption to electrode deposition ratio was decreased from 2.5 for the commercially available material to 1.45 for that of the new formulation.

Based upon this information, it was found that the constituent range indicated below provides a sufficient degree of flexibility necessary for tailoring a formulation to meet a given need. Also the preferred MnO to $SiO_2$ ratio, together with the BaO range, aids in controlling both the melting rate of the electrode and the flux consumption rate.

*Range Constituents Present*

| | |
|---|---|
| $SiO_2$ | 40–46 |
| MnO | 24–46 |
| $CaF_2$ | Trace–8 |
| FeO | 2 max. |
| $Al_2O_3$ | 1 max. |
| CaO | 3 max. |
| $TiO_2$ | 1 max. |
| BaO | Trace–3 |
| $Na_2O$ | 0.5 max. |
| $K_2O$ | 0.5 max. |
| MgO | 1 max. |

Ratio range $\frac{MnO}{SiO_2} = 0.6$ to $1.0$

The following is an actual formulation of a welding flux of the manganese alumina silicate type:

| | Percent |
|---|---|
| MnO | 30.0 |
| $Al_2O_3$ | 21.8 |
| $SiO_2$ | 39.6 |
| $CaF_2$ | 5.0 |
| MgO | 0.1 |
| CaO | 0.5 |
| BaO | 0.1 |
| FeO | 1.5 |
| $TiO_2$ | 0.7 |
| $K_2O$ | 0.5 |
| $Na_2O$ | 0.1 |
| PbO | 0.1 |
| | 100.0 |

As has been pointed out above with respect to the manganese silicate type, the manganese alumina silicate type welds carried out at 900 amperes, 40 volts, 24 in./min., the flux consumption to electrode deposition ratio was decreased to 1.2. The addition of 2% of BaO to the above composition reduced the electrode melting rate by over 15 percent so that the flux consumption to electrode deposition was 1.50.

From the foregoing it will be clear to those skilled in the art that the invention includes the following novel features and advantages:

A fused submerged-arc welding flux of a class composed substantially of MnO and $SiO_2$, so formulated that the electrode deposition rate is relatively independent of the flux consumption rate;

A fused submerged-arc welding flux of a class composed substantially of MnO—$Al_2O_3$—$SiO_2$, so formulated that the electrode deposition rate is relatively independent of the flux consumption rate;

A fused submerged-arc welding flux wherein the range of the $MnO$-$SiO_2$ ratio varies from 0.6 to 1.0 while the amount of BaO present varies from substantially 0 to 3 percent;

A fused submerged-arc welding flux whose BaO content is preferably less than 0.25 percent to permit adequate control over the melting rate of the consumable electrode;

A fused submerged-arc welding flux wherein sufficient control over the MnO-SiO$_2$ ratio provides a method for regulating the flux consumption rate in a welding operation; and A fused submerged-arc welding composition wherein a low BaO constituency in combination with a controlled MnO-SiO$_2$ ratio provides a means for obtaining maximum electrode deposition with minimum flux consumption.

What is claimed is:

1. A submerged melt welding composition composed of 42.0 percent MnO, 45.0 percent SiO$_2$, 6.9 percent CaF$_2$, 0.3 percent MgO, 1.2 percent CaO, 0.1 percent BaO, 2.0 percent Al$_2$O$_3$, 1.5 percent FeO, 0.1 percent TiO$_2$, 0.4 percent K$_2$O, 0.4 percent Na$_2$O, and 0.1 percent PbO.

2. A submerged melt welding composition composed of 40–46 percent SiO$_2$, 24–46 percent MnO, 4–8 per cent CaF$_2$, 2% (max.) FeO, 1% (max.) Al$_2$O$_3$, 3% (max.) CaO, 1% (max.) TiO$_2$, 0–3% BaO, 0.5% (max.) Na$_2$O, 0.5% (max.) K$_2$O, 1% (max.) MgO; in which the ratio of MnO to SiO$_2$ falls between 0.6 and 1.0, inclusive.

3. Method of obtaining maximum electrode deposition with minimum flux consumption in work-in-circuit submerged melt welding with a consumable metal wire or rod constituting such electrode, which comprises blanketing the operation in a fused submerged melt welding composition as defined by claim 2 composed mainly of SiO$_2$ and MnO having a relatively low BaO constituency of less than 3% in combination with a controlled MnO-SiO$_2$ ratio of between 0.6 and 1.0.

4. Method of submerged melt welding which comprises feeding a ferrous metal electrode toward steel work while supplying welding current thereto at a voltage sufficient to cause the end of said electrode to melt under a blanket of granular fused welding composition as defined by claim 2, whereby such welding is accomplished at a substantially decreased composition to electrode deposition ratio, and at a substantially increased electrode melting rate.

5. Submerged melt welding which comprises feeding a consumable metal electrode toward the work-in-circuit to be welded under a blanket of submerged melt welding composition consisting of a fused flux as defined by claim 2, whereby the deposition rate of such electrode is relatively independent of the consumption rate of such flux.

6. Submerged melt welding as defined by claim 5, in which the ratio of MnO to SiO$_2$ varies from 0.6 to 1.0, and the flux contains BaO from a trace up to 3% of the composition to increase the deposition rate by a decreasing in the BaO content thereof.

7. A submerged melt welding composition composed of 30.0% MnO, 21.8% Al$_2$O$_3$, 39.6% SiO$_2$, 5.0% CaF$_2$, 0.1% MgO, 0.5% CaO, 0.1% BaO, 1.5% FeO, 0.7% TiO$_2$, 0.5% K$_2$O, 0.1% Na$_2$O and 0.1% PbO.

References Cited in the file of this patent
UNITED STATES PATENTS

| | | |
|---|---|---|
| 2,043,960 | Jones et al. | June 9, 1936 |
| 2,360,716 | Peters | Oct. 17, 1944 |
| 2,474,787 | Landis et al. | Jan. 28, 1949 |